FIG. 1.

INVENTOR
Stephen W. Smith
BY John R. Manning
ATTORNEY

United States Patent Office 3,193,283
Patented July 6, 1965

3,193,283
DOCUMENT SORTING
Stephen W. Smith, Dallas, Tex., assignor to Sperry Rand Corporation, New York, N.Y., a corporation of Delaware
Filed Dec. 28, 1962, Ser. No. 248,091
14 Claims. (Cl. 271—47)

This invention relates to document sorting and more especially to means for detecting a document jam condition for halting the operation of the sorting system and permitting removal of the jammed documents.

Commercial operations of the present day require the processing of great numbers of documents. One such business operation which has received the full impact of processing large numbers of documents is the banking industry. Bank drafts and checks are presently used for the payment of goods, services, etc., to the exclusion of practically any other method of payment. Accordingly, as our economy advances, increasing numbers of bank checks and documents are drawn on the depositor institution.

The typical banking institution of the past has had to maintain a large staff of clerical assistants for the processing of the checks, drafts, deposit slips, etc. Manual operations of these clerical assistants were required for the posting of the checks and deposit slips to the customers' account. These large staffs of clerical people are expensive to maintain; they process documents at a relatively slow rate; and, are inefficient in that a great number of errors are committed. Accordingly, it is necessary that some mechanical and/or electronic means be devised to quickly and accurately process the bank documents at a minimum charge or cost to the banking institution.

As noted, as our modern businesses have increased in size and complexity, automatic means must be utilized for the handling of these business documents generated as a result of business transactions of the depositor. In addition, institutions or industries involving sales, tranportation, as well as banks and the like, are faced with the problem of sorting and accounting on a day-to-day basis for documents such as the checks, deposit slips, tickets, sales slips, etc. in such quantity that manual handling of these business documents becomes prohibitive and is almost a hopeless undertaking. Although several systems have been devised in working toward a solution to this problem, it appears that the use of human language symbols printed in magnetic ink on the documents themselves, in conjunction with equipment capable of recognizing these symbols automatically, is perhaps the most practical means for minimizing the manual handling of the documents.

It is recognized that all documents presented for sorting to a document sorter will not be successfully sorted since the documents or checks may become mutilated, torn, be stapled or clipped, or defaced in such a manner that the document invariably causes a jam within the machine. If the jammed document is not quickly removed from the system, subsequent documents will be forced against the jammed document and cause the mutilation of otherwise acceptable and sortable checks. It is in this light that the present invention has been made, eliminating many limitations inherent in previous document sorting operations.

The device for automatically sorting documents such as bank checks is the high speed MICR (Magnetic Ink Character Recognition) check sorter presently known in the art. As the documents are individually and successively advanced past a magnetic reading station, the magnetic numbers formed upon the face of the check are interpreted and the document is directed to a pocket according to the magnetic code placed thereon. High speed document sorters will operate and sort documents at upwards of 1800 documents per minute. When operating at these high speeds, it is necessary that the documents be positively gripped and driven and not be allowed to "float" during their travel. Floating documents will slow down and attain speeds less than the deired speed and thus cause the succeeding documents to be forced against the earlier documents which results in a jammed condition. It is inevitable that a jam may occasionally occur in the system. In devices of this type known in the art, it is necessary for the operator to visually observe a jam and, after observance of such a condition, cause the operation of the system to be halted by depressing a "panic" switch or by any other appropriate means. During the interval from the time that the jam is detected and the operation of the machine halted, as many as 100 otherwise sortable documents, would be forced against the jam and thus cause their mutilation.

Accordingly, it is desirable that automatic means be devised to detect such a jam and thus cause the operation to be halted and the succeeding documents diverted to avoid the mutilation of the subsequent documents. In addition, it is necessary that the device be such that the documents causing the jammed condition may be easily and quickly removed and the sorting operation restarted at the earliest possible time.

Accordingly, it is the principal object of this invention to improve document sorters.

It is another object of the present invention to improve document sorters capable of processing bank documents, such as checks, at high rates of speed.

It is a further object of the present invention to provide a means for quickly detecting a document jammed condition.

It is a still further object of the present invention to reduce the number of documents mutilated in high speed document sorting operations.

It is still another object of the present invention to provide means for easily and quickly removing a jammed document.

It is a still further object of the present invention to provide means for automatically detecting the presence of a jam which opens the document path and prevents the further feeding of documents.

To accomplish these and other objects, means are provided for receiving the documents to be sorted in an input hopper and for advancing the documents toward a picker arm. As the document is presented to the picke. arm, the document is swiftly and individually passed in front of a document doubles preventer and into a pair of flexible belts. The width of the belts is much less than the width of the checks so that the magnetic numbers placed on the lower face of the document may be read by a magnetic reading head positioned along the check or document way. The document is then advanced by the frictional engagement of the flexible belts to a series of document presence detectors and past a series of gates positioned along the document path. As a result of reading the magnetic characters placed upon the document, one of the series of gates will be actuated and cause the document to be diverted from the common document path to one of the second paths which leads to an output pocket. The jam detecting means are located along the document path or way and in the areas where the jam is more likely to occur. These areas are along the document path located juxtaposed the sorting gates. If a sorting gate should fail to open properly, the document may strike the sorting gate and commence to crumple or tear. Other instances in which a jam may occur is when a torn document engages one of the elements, including the sorting gates, positioned along the check path such as the check guiding means, a pulley, etc. As the document starts to crumple or "accordion" it will assume a position in space wider than that permitted for a normal flat document. This crumpling of the document is detected by sensing means positioned along the document path which when actuated, will cause one side of the document path to open thus preventing further mutilation of the crumpled document and the succeeding documents. In addition, the entire sorting system may be halted.

The opening of the document path is accomplished by mounting one side of the document guiding means upon a slidable plate (known as a carriage) and providing a linkage which may be actuated automatically by a solenoid to cause the carriage to be moved outwardly and thus open the document path. Additional flexible belts are provided upon the carriage which form one side of the document path and are frictionally driven by the flexible belts forming the other side of the document path. In addition, means are provided for manually restoring the carriage to its position along the document path or for manually opening the document path when desired. Any number of secondary document paths leading to output pockets may be provided which lead from the primary or common document path and in the particular embodiment that is shown and described, three such paths are provided. It will be understood that any number of paths may be mounted upon a single slidable plate or carriage as required. In addition, the uppermost portion of the means upon the carriage, is hinged so that the upper portion of the slidable element forming a portion of the document way, may be moved outwardly and downwardly about its pivot point and thus provide easy access for removal of the document jam. In addition, means are provided for halting the operation of the system upon the detection of a jam.

These and other objects of this invention will be brought out more fully in the following description of an illustrative embodiment thereof, when considered in connection with the accompanying drawings, wherein like reference characters refer to like or similar parts, and in which.

Figure 1:
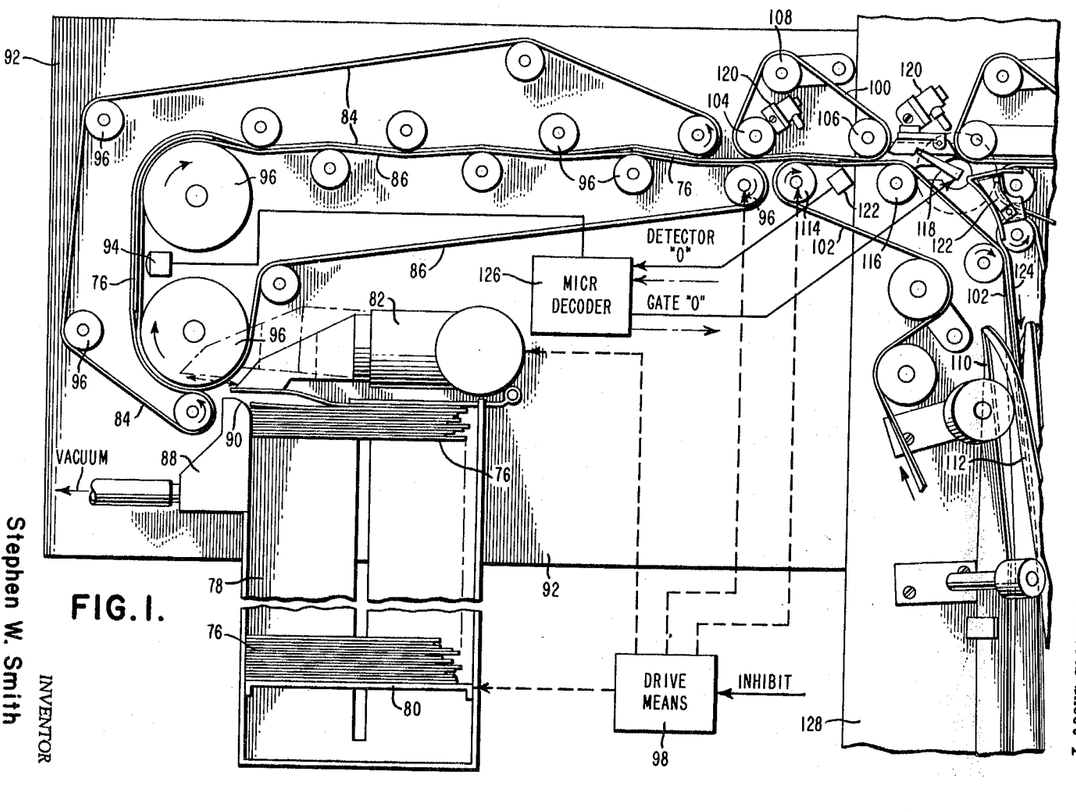
FIGURE 1 is a plan view of the sorting system.

As shown in the FIGURE 1, the documents or checks 76 are placed in an input hopper 78. A backup plate 80 is positioned against the last document in the stack for advancing the documents toward a picker arm 82, at a rate determined by the speed at which the documents are removed from the input hopper 78. The picker arm 82 may be of a vacuum type that oscillates in the manner shown in dotted outline for advancing the first document in the stack toward the feed belts 84 and 86.

As the picker arm 82 advances the document toward the feed belts 84 and 86, the document 76 passes a vacuum doubles preventer 88 which serves to inhibit the feeding of any double documents by holding the double document at the entrance 90 of the vacuum doubles preventer 88. All of the foregoing elements may be mounted upon a suitable base member such as the base plate 92.

The documents 76 presented by the picker arm 82 to the flexible feed belts 84 and 86, are advanced past a magnetic reading head 94, which magnetic reading head 94 is positioned adjacent the document path formed by the feed belts. The feed belts 84 and 86 are mounted and driven by a plurality of pulleys 96 which form the document path or way. The flexible belts 84 and 86 serve to accurately and quickly transport the document past the magnetic reading head 94 and to the common document path along which the deflecting members or gates are positioned. The pulley 96 may be driven by any suitable drive means such as the driving means 98 and this rotational movement results in the advancement of the flexible feed belt 86. The flexible belt 84 is positioned in frictional engagement with the belt 86 and the motion of the belt 86 is transmitted to the belt 84. As documents 76 are injected between the belts 84 and 86, a motion of the documents 76 results which corresponds to the document path formed by the feed belts. The belts 84 and 86 are much narrower in width than the width of the document. For example, in an embodiment of the invention which was operated and constructed, the feed belts were approximately 1 inch wide.

As shown in the FIGURE 1, two documents 76 are shown being transported by the belt system. One of the documents 76 is shown passing in front of the magnetic reading head 94 and the other document is shown emerging from the document path and into the sorting area. The sorting area is shown at the right side of the FIGURE 1 and in detail in the FIGURE 2.

The sorting area will be discussed in detail with reference to the FIGURE 2; however, as shown in the FIGURE 1, the documents are advanced by other flexible belts such as the upper flexible belt 100 and the lower flexible belt 102. The flexible belt 100 has the pulleys 104 and 106 positioned along the document path and the pulley 108 is positioned away from the document path in such a manner that the pulleys 104, 106, and 108 form a triangular configuration. The pulley 108 is mounted upon the base member 92 in such a manner that adjusting means for providing the proper tension of the belt may be accomplished.

The lower belt 102 passes along the document path near and in engagement with the belt 100 and extends on through document turnover devices 110 and 112 to an output hopper, not shown. The pulleys 114 and 116 are positioned along the document path and the pulley 114 drives the flexible belt 102 from the driving means 98. Since the belt 102 is in frictional engagement with the belt 100, the belt 100 is also driven.

Positioned along the document path are a plurality of deflecting members or gates 118, one of which is shown (in an opened position) in the FIGURE 1.

Positioned between and within the triangular area formed by the pulleys 104, 106, and 108 is a light source 120. Light from the light source 120 will impinge upon a photo pickup tube 122 positioned on the opposite side of the document path from the light source 120. As a document breaks the light path between the light source 120 and the photo pickup device 122, the change in signal from the photo pickup device 122 may be utilized to actuate the deflecting member or gate 118 which diverts the document from the common document path into the path formed by the belt 102 and a belt 124.

As noted, the drive means 98, which may be an electric motor or other device, will drive the backup plate 80 to advance the documents toward the picker arm 82; will rotate and cause the desired motion of the pickup arm 82 at a repetitive cycle equal to the desired sorting speed; will drive the belt system formed by the initial feed belts 84 and 86; will drive the belt 82 through the pulley 114 of the secondary belt system; and, all remaining belt systems throughout the systems for advancing the documents. In the case of a document jam or other condition wherein it is desired to inhibit the operation of the system, a signal on the inhibit conductor the the drive means 98 will quickly stop the motion of the drive means and the resulting linkages coupled thereto.

As shown in the FIGURE 1, the MICR (Magnetic Ink Character Recognition) decoder 126 may be of the type shown in copending application Serial No. 114,784, of M. D. Sanner, filed June 5, 1961, entitled "Null Dependent Symbol Recognition," and assigned to the same assignee as the present invention. The purpose of the decoder 126 is to receive the output signal from the magnetic reading head 94 and according to the signal received, determine the pocket assignment of the check or document to be sorted. If, for example, as shown in the FIGURE 1 the gate "0" is to be selected, then the document detector "0" formed by the first set of means including the light source 120 and the photo pickup device 122 will signal the arrival of the document 76 at that point, by a decreased output from the pickup device 122. The decoder 126 then utilizes this output from the pickup device 122 to actuate the gate 118 on the gate "0" conductor at the appropriate time to cause the document 76 to be diverted from the common document path into the feed path formed by the belts 102 and 124. As soon as the document has been diverted, the gate "0" signal to the gate 118 disappears and the gate 118 rotates in a counter-clockwise manner to remove itself from the common document path. Document jam detection means are provided along the common document path which will be discussed in detail with reference to the FIGURES 2, 4, 5, and 6.

Figure 2:
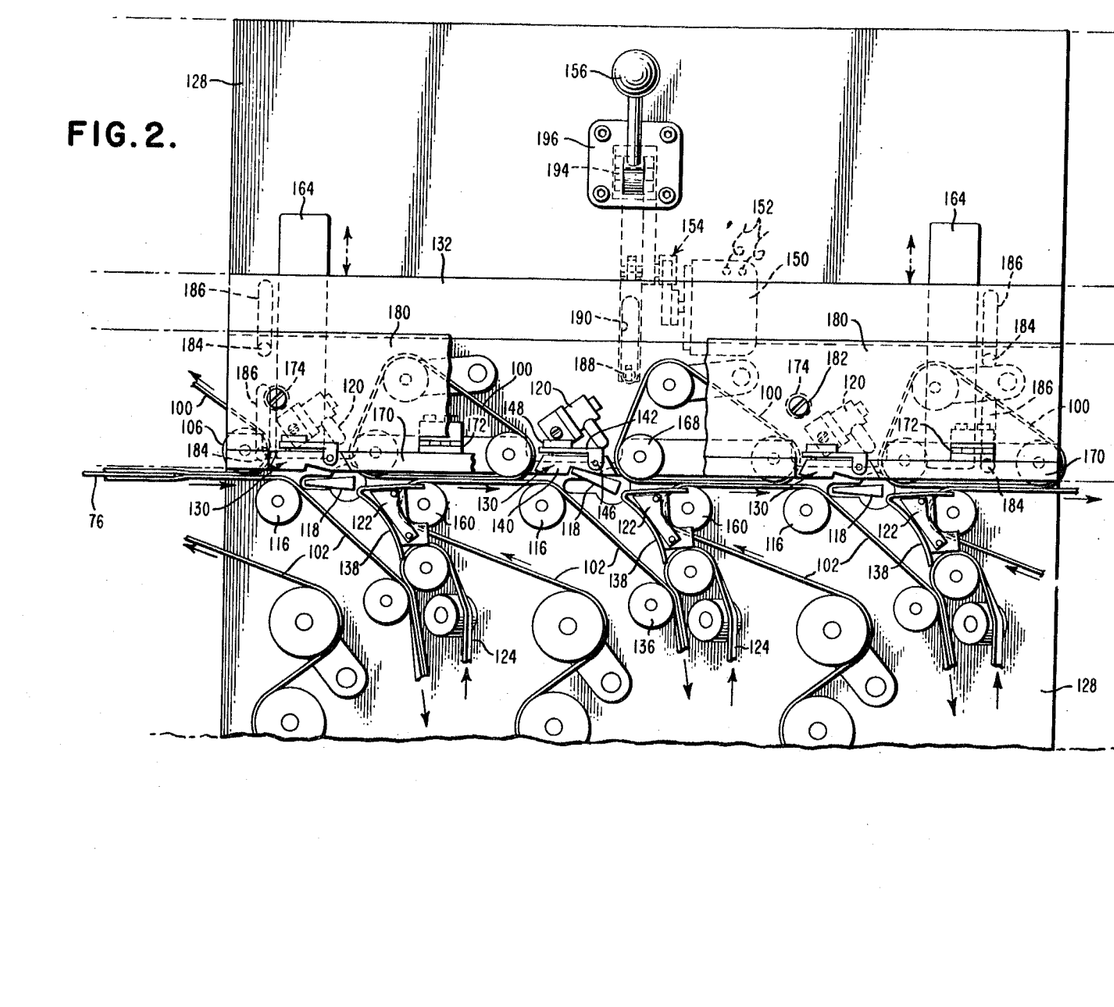
FIGURE 2 is a plan view of the document sorting gates, the movable carriage assembly forming one side of the document path, and the rigid guide means forming the other side of the document path.

In the FIGURE 2, the documents 76 enter the sorting mechanism as shown and advance in the direction shown by the arrows. The document path past the deflecting members or gates 118 is known as the common document path. The output document paths project from the common document path and when the gate or deflecting member 118 corresponding to the associated output document path is actuated, then the document 76 is deflected into the output document path and stacked in an output hopper, not shown. The device is constructed in such a manner that one side of the document path can, upon command, move rearwardly and thus open the document path. This opening of the document path will prevent further mutilation of the documents in the case of a jam and also provide means for easily removing the jammed document. Three such sections, three gates 118 and three output document paths, are shown in the FIGURE 2; however, it will be understood that any number of sections may be shown and in the particular embodiment that was constructed, it was found that three such sections could be conveniently mounted upon a movable plate which would move away, upon command, and open the document path.

The elements of the FIGURE 2 will now be discussed in detail. In this figure, three secondary paths are shown leading from the common document path which the document 76 is shown as entering. Since the secondary paths and elements associated therewith are similar in each of the three areas, only the center area will be described in detail. The elements associated with the first secondary document path were discussed generally during the description of FIGURE 1. The document transporting elements forming the secondary paths to the output pockets (not shown) are mounted upon a base member 128. These are the elements shown below the common document path. The elements above the common document path and comprising the light sources 120, the jam detectors 130, and the rollers forming a triangular belt path are mounted on a movable member 132. The movable member 132 and the elements mounted thereon will be described in detail with reference to the FIGURE 3 hereinafter.

In the FIGURE 2, the deflecting members or gates 118 are positioned along the common document path. A key-shaped aperture 134 is formed in the base member 128 to receive the gate 118. The gate 118 is assembled from underneath the base member 128 with the deflecting portion of the gate extending along the document path while the actuating solenoid (not shown) and its associated supporting members remain below the surface of the base member 128. The deflecting gate 118 shown in the middle area of the FIGURE 2 is shown in its open or extended position to deflect a document while the remaining two gates are shown in their closed or non-deflecting positions. As shown in the center portion of the FIGURE 2, a pulley 116 is positioned along the common document path while a pulley 136 is positioned away from the common document path in such a manner that the belt 102 which passes over the pulleys 116 and 136 forms an angle of approximately 45 degrees away from the common document path. A V-shaped deflecting member 138 has one of its extensions extending along the common document path while the other extension of the V-shaped member 138 is positioned along the section of the belt 102 formed across the pulleys 116 and 136. This section of the member 138 serves to force the document into engagement with the belts 102 and 124 after the gate 118 has deflected the check or document into this pocket. Various other pulleys are positioned on the base member 128 to direct the deflected document to its associated output hopper.

Within the V-shaped deflecting member 138 is mounted the photo pick-up device 122. An aperture is provided in the V-shaped deflecting member 138 to permit light from the light source 120, which element is positioned on the movable member 132, to be picked up by the photo pickup device 122. It will be noted that because of the angular arrangement of the light source 120 and the photo pickup device 122, no light will be received by the pickup device 122 when the movable member 132 is moved away from the common document path, which movement will be described hereinafter. The light source 120 and the photo pickup device 122 shown in the center portion of FIGURE 2, serves to detect the presence of a document which would be deposited in the next following output hopper by deflection of the gate 118 shown at the extreme right of the FIGURE 2. This arrangement will be intuitively clear since it is obvious that the presence of the check must be detected before the arrival of the document at the deflecting gate 118 associated with the desired pocket in which the check is to be deposited.

A document jam detector 130 is positioned along the common document path to detect the ocurrence of a document jam. The description of the document jam mechanism 130 will be reserved for the discussion pertaining to the FIGURES 4, 5 and 6. Briefly, the jam detecting mechanism 130 comprises a movable jam plate 140 which is supported in a bracket 142 by a pin 146. Positioned next to the jam plate 140 is an electrical switch 148. A jammed check will cause the jam plate 140 to be pivoted about the pin 146 and against the actuating member of the switch 148, which switch will then signal on its output conductors that a jam has occurred which immediately results in actuation of a solenoid to cause the common document way or path to open and the system to be halted.

Figure 3:
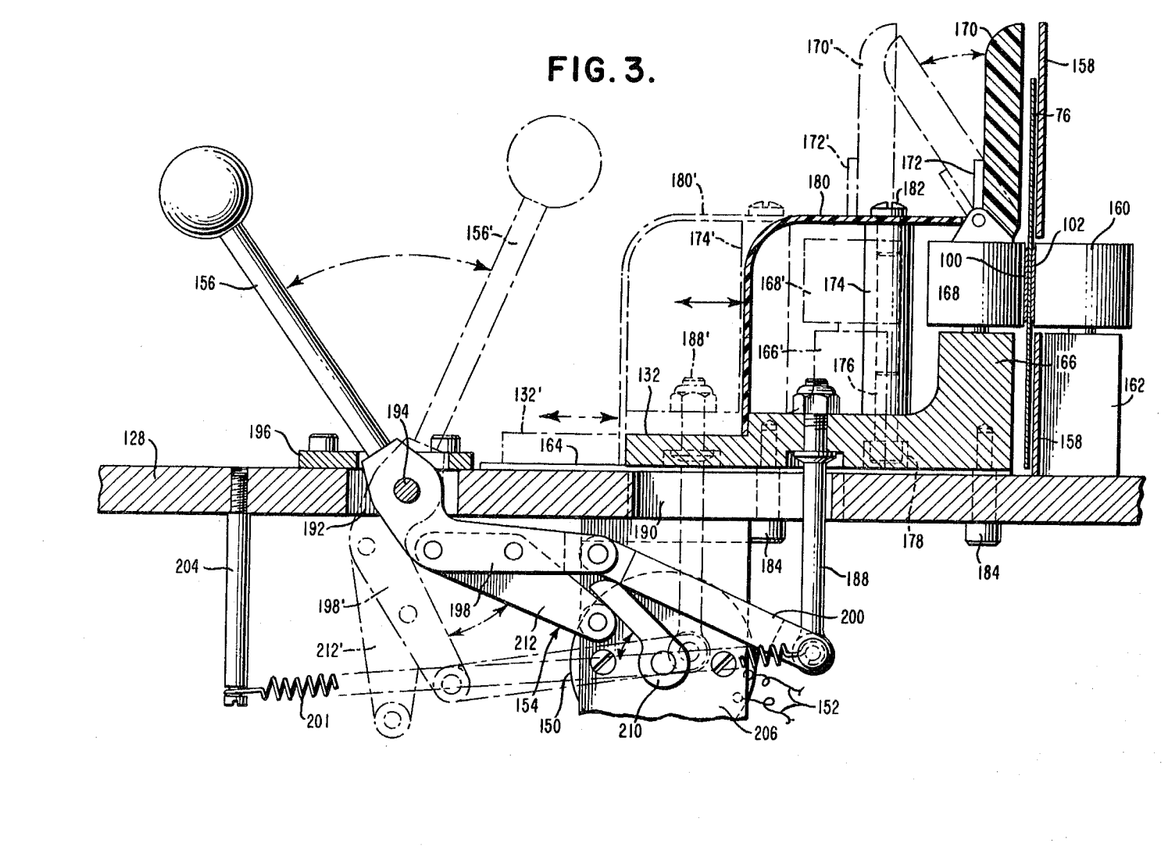
FIGURE 3 is an enlarged elevation view in section of the movable carriage assembly.

As shown in the FIGURE 3, a rotary solenoid 150 having electrical output leads 152 is coupled to mechanical linkage 154 to cause the movable member 132 to be moved upwardly and thus opening the document path. A mechanical operating knob 156 is connected to the mechanical linkage 154. Upon detection of a jam, the switch 148 will be actuated and close a circuit thus providing a signal to the electrical leads 152 of the solenoid 150 to cause the carriage and movable member 132 to move upwardly and thus open the document path and inhibit the feeding and transportation of the documents along the common document path.

An elevation view in section of the document path and the carriage is shown in the FIGURE 3. The function of the device shown in FIGURE 3 is to form one side of the document path and, upon command, move outwardly and open the document path to prevent the further feeding of documents. The movable elements or carriage may be opened manually by actuation of the manual operating knob 156 or by the application of an electrical signal on the leads 152 of the rotary solenoid 150.

The base member 128 is the main supporting base for the entire sorting system. One side of the document path, which does not move, is formed by the perpendicular and vertical member 158 which has a portion removed to permit a pulley 160 to extend therethrough and slightly into the document path. The flexible belt 102 is positioned against the pulley 160. The pulley 160 is supported by any suitable supporting means 162 upon the base member 128. The movable elements of the carriage comprise the elements above the base member 128 and to the left of the document 76. It will be understood that the pulley 160 and the belt 102 also move but only in a rotary manner. The movable elements are shown in cross-section in the closed position and in dotted outline in the open position. The base or movable member 132 of the carriage is supported at two points above the base member 128 by a bearing surface 164 which may be a flat plastic material. The movable member 132 has an extending portion 166 which forms the lower portion of the movable document path and supports a pulley 168. A belt 100 is positioned against the pulley 168 and into frictional engagement with the document 76. The belt 100 is driven by the frictional engagement of the belt 102 or the document 76. Supported by any suitable means above the pulley 168 and extending along the entire length of the carriage is a hinged rectangular member 170. The member 170 is biased in a vertical position by the biasing means 172. The member 170 may be rotated in a counterclockwise direction, as shown, to inspect the document path or to clear document jams. A tapped cylindrical standoff 174 is supported vertically on the base member 132 by the bolt 176 whose head is recessed into the base member 32 in the slot 178. A cover 180 having a horizontal portion and a vertical portion is placed over the elements of the carriage and supported by a bolt 182 through a hole in the cover 180 to engage the standoff 174. The cover 180 serves as a dust cover and a safety device for housing moving parts.

As shown best in the FIGURES 2 and 3, there are four guide bolts 184 which move within slots 186, which slots 186 are formed in the base member 128. The bolts have their heads extending below the surface of the base member 128 and pass through the member 128 and are tapped into the lower portion of the movable base member 132, as shown. The bolts 184 and the slots 186 serve as an alignment means for insuring the constancy of the document way or path.

A post 188 extends downwardly and perpendicular to the base member 128 and is secured at its upper end to the movable member 132. The post 188 moves in a slot 190 formed in the base member 128.

The manual operating lever 156 passes through a slot 192 formed in the base member 128 and pivots about the pin 194. The pin 194 is rigidly secured by the securing means 196 to the upper side of the base member 128. An arm 198 extends from the lower side of the operating lever and forms an angle of approximately 135 degrees. A link 200 connects the lower end of the post 188 with the arm 198. The post 188 and its connecting linkages 198 and 201 are biased in an off-center locked position by a spring 200 which is connected to one end of a post 204 whose other end is threaded into the lower side of the base member 128. A plate 206 extends downwardly from the base member 128 and supports the solenoid 150. The rotary solenoid 150 has a shaft 208 which is connected to a finger 210. The finger 210 engages a triangular element 212 which is rigidly secured to the arm 198. It will be noted that the normal closed position of the carriage will cause the arm 198 and the link 200 to be positioned in an off-center manner. An electrical signal applied to the leads 152 of the solenoid 150, will cause counterclockwise rotation of the shaft 208, forcing the finger 210 in a similar counterclockwise manner and urge the element 212, coupled to the arm 198, downwardly and rearwardly and cause these elements, and the operating lever 156, to rotate about the pin 194. This action results in a movement of the entire carriage mechanism to the left. This open position is shown by the same reference numerals with the prime identification. Thus, the opened position of the carriage is shown with the cover 180 labeled 180', the operating lever 156 as 156', etc.

After the document jam has been cleared, the carriage may be "reset" or returned to its closed position by a manual restoring force applied to the opperating lever 156'.

Figures 4, 6:
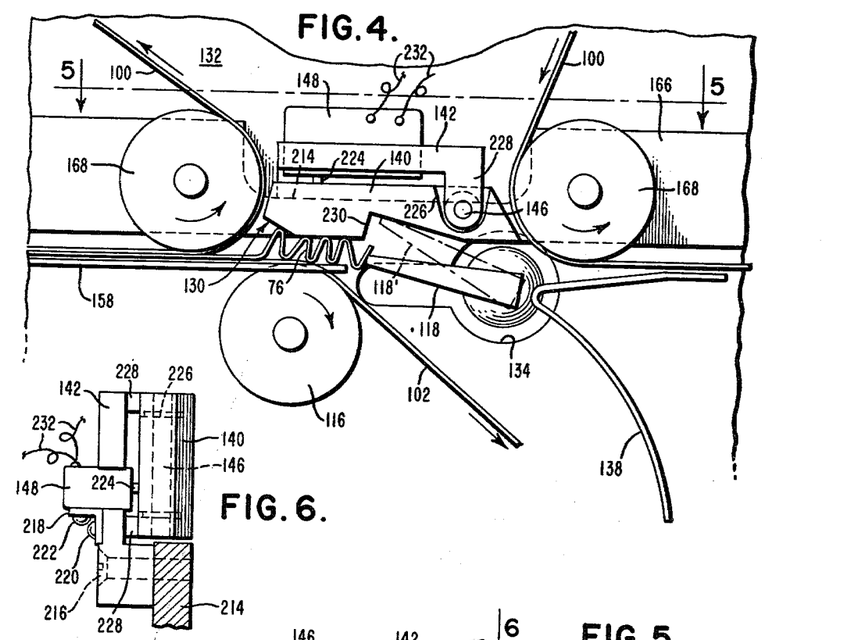
FIGURE 4 is an enlarged plan view of the document gate and the document jam detecting means.
FIGURE 6 is a sectional view taken along the lines 6—6 of the FIGURE 5.

The jam detecting mechanism is shown in detail in the plan view of FIGURE 4. The same referance numerals are used in the FIGURE 4 as shown in the similar elements of the FIGURE 2. The common document path in the FIGURE 4 extends below the pulleys 168 and upon the pulley 116. The deflecting member or gate 118 is shown in a partially open condition and in dotted outline at 118' in its fully opened position. As shown in the FIGURE 5, which is a sectional view taken along the lines 5—5 of the FIGURE 4, the base member 128 has a perpendicular vertical extending portion 214 extending therefrom. As shown in the FIGURE 6, which is a sectional view taken along the lines 6—6 of the FIGURE 5, the vertical extending portion 214 supports the bracket 142. The bracket 142 is substantially U-shaped with a portion removed to receive the electrical switch 148. The bracket 142 is secured to the member 214 by the bolts 216 of the FIGURES 5 and 6. A small angle bracket 218 is secured by bolts 220 to the bracket 142. The remaining flat portion of the angle bracket 218 is used to support the switch 148 by the bolts 222. The switch 148 extends through the bracket 142 and has an actuating member 224 (FIGURES 4, 5 and 6) in engagement with the jam plate 140.

Figure 5:
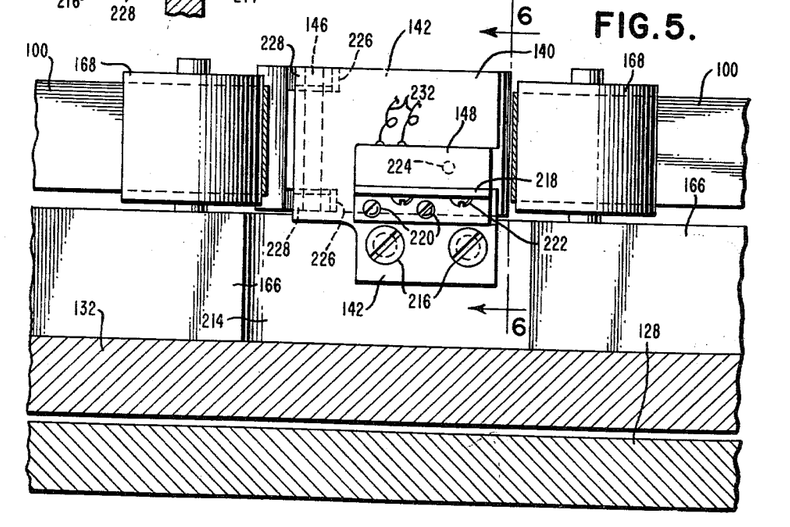
FIGURE 5 is a sectional view taken along the lines 5—5 of the FIGURE 4.

The jam plate 140 is mounted for rotational movement about the pin 146 between the pulleys 168 of the FIGURES 4 and 5. The leading edge of the jam plate 140 is beveled and the trailing edge of the jam plate 140 is recessed at 226 to receive the two extending arms 228 from the bracket 142. A notch 230 is formed in the bracket 140 to receive the gate 118 when it is in its extended or open position. Thus, the bracket 142, the angle bracket 218 and the switch 148 are rigidly secured while the jam plate 140 is permitted to move about the pin 146.

In the FIGURE 4, the gate 118 is shown in a partially open condition which is causing the mutiliation of a document 76. As the flexible belt 100 and 102 force the document 76 toward the gate 118, the crumpling action of the document 76 will cause the jam plate 140 to be actuated in a clockwise movement about the pin 146. The displacement of the jam plate 140 from its normal position, will depress the actuating member 224 of the switch 148 and thus close the electrical circuit between the output conductors 232 from the switch 148. This signal on the conductors 232 may be utilized to actuate the solenoid 150 thus forcing the carriage mechanism outwardly and opening the document path. In addition, the electrical signal on the conductors 232 of the FIGURE 4 may be applied to the "inhibit" input of the drive means 98 of the FIGURE 1 which results in the removal of the driving power to the various elements of the sorter. This release of the movable carriage and resulting stopping of the document sorter system prevents the further mutilation of documents in the case of a check jam.

A check jam is not caused by the elements of the sorting system but by the condition of the document itself. The document sorting system of the present invention will continuously read and sort the documents into the desired pockets and check jams will usually occur only when the condition of the check is such that it cannot pass through the document system. If a check is torn, mutilated, stapled or paper clipped or fails to properly engage the flexible belts so that timing is lost, document jams may occur.

Operation

Documents are placed in the input hopper 78 of the FIGURE 1 with the first document positioned against the pickup arm 82 and the last document engaging the back-up plate 80. The drive means 98 are brought up to speed, and power is supplied to advance the backup plate 80; to cause the oscillatory movement of the pickup arm 82; to drive the belts 84 and 86 through the pulley 96; and, to drive the remaining belt systems such as that shown being driven through the pulley 114. As the document passes the magnetic reading head 94, a signal is induced in the head 94 which is transmitted to the decoder 126. The decoder 126 will select the pocket in which it is desired to place the document and when the document presence detector comprising the light source 120 and the photo pickup device 122 detects that the check is approaching the gate 118 associated with the desired output pocket, the decoder 126 will provide a signal to actuate the rotary solenoid (not shown) associated with the particular gate 118. In the sorting routine shown in the FIGURE 1, gate "0" is shown as actuated and would receive the document approaching that gate. In the FIGURE 2, the middle gate is shown in its open or actuated position while the left and right gates are shown in their closed or non-deflecting positions.

If for some reason a document 76 strikes the gate 118 or other elements along the document way as shown in the FIGURE 4, the jam detectors would be actuated. The crumpling of the document 76 would cause the jam plate 140 to be rotated about its pivot pin 146 and thus actuate the switch 148 through its actuating member 224. The switch 148 would then close a circuit (not shown) which would cause the solenoid 150 of the FIGURE 3 to rotate the finger 210 in a counterclockwise manner which engages the element 212 and forces the carriage open by moving the base member 132 to the left. Since the elements forming the left side of the document path are mounted upon this base member 132, the document path would be opened and thus prevent further mutilation of any documents. At the same time, the circuit on the conductors 232 from the switch 148 would be utilized to provide an inhibit signal to the drive means 98 of the FIGURE 1 which results in an immediate stopping of the sorting system. With the carriage of the FIGURE 3 now in its open position, the jammed document may be conveniently removed by urging the member 170 about its hinged axis, which provides easy access to the document path. With the jammed document now removed the carriage may be placed in its normal position by moving the manual actuating lever 156' back to the position 156 which results in a closing of the document path. The system is now ready for operation in a manner hereinbefore described.

Thus, there has been described and shown a document sorting system wherein means are provided for receiving the documents to be sorted in an input hopper and for advancing the documents toward a picker arm. As the document is presented to the picker arm, the document is swiftly and individually passed in front of a document doubles preventer and into a pair of flexible belts. The previously formed magnetic numbers placed on the lower face of the check may be read by a magnetic reading head positioned along the document way. The document is then advanced by the frictional engagement of the flexible belts to a series of document presence detectors and past a series of gates positioned along the document path. As a result of reading the magnetic characters placed upon the document, one of the series of gates will be actuated and cause the document to be diverted from the common document path to one of the secondary paths which leads to an output pocket.

Jam detecting means are located along the document path or way and in the areas where the jam is more likely to occur. As a document commences to crumple or "accordion" it will assume a position in space wider than that permitted for a normal flat document. This crumpling of the document is detected by sensing means positioned along the document path which when actuated, will cause one side of the document path to open thus preventing further mutilation of the crumpled document and the succeeding documents. In addition, the entire sorting system may be halted.

The opening of the document path is accomplished by mounting one side of the document guiding means upon a slidable carriage and providing a linkage which may be actuated by a solenoid to cause the carriage to be moved outwardly and thus open the document path. Additional flexible belts are provided upon the carriage which form one side of the document path and are frictionally driven by the flexible belts forming the other side of the document path. After the jam is cleared, means are provided for manually restoring the carriage to its position along the document path. In addition, the uppermost portion of the carriage along the document way is hinged so that the upper portion of the slidable element forming a portion of the document way, may be moved outwardly and downwardly about its pivot point and thus provide easy access for removal of the jammed document.

While the form of document sorting system which is herein shown and described is adapted to fulfill the objects primarily stated, it is to be understood that it is not intended to confine the invention to the one form or embodiment herein disclosed, for it is susceptible of embodiment in various other forms, all coming within the scope and intent of the invention.

What is claimed is:

1. A document sorting system comprising an input hopper for supporting documents to be sorted, means for successively removing documents from said input hopper, means for transporting the removed documents along a common document path, a plurality of document deflecting means, first guide means having a plurality of removed portions to receive said document deflecting means, a deflecting means per removed portion, said first guide means positioned along and forming one side of the common document path, selectively further guide means parallel to said first guide means forming the other side of the document path and selectively and movable in a path perpendicular to the direction of documents along said document path, continuously operating jam detecting means positioned along said document path for detecting the abnormal departure of a document from its positon in substantially a single plane, and means connecting said jam detecting means to said further guide means for displacing said further guide means upon the detection of a document jam by said jam detecting means.

2. The document sorting system recited in claim 1 including electrical circuit means coupled between said jam detecting means and said means for transporting documents, said electrical circuit inhibiting the operation of said means for transporting documents upon the detection of a document jam by said jam detecting means.

3. A document sorting system comprising means for transporting documents along a document path, and a movable carriage positioned along and forming one side of the document path, said carriage comprising a base member, a post affixed to and extending from said base member, an operating arm, mechanical linkage means connecting said post to said operating arm, a solenoid positioned below said base member, and a finger coupled to said solenoid and engaging said mechanical linkage means connecting said post to said operating arm and continuously operating document jam detecting means positioned along said document path for detecting the abnormal departure of a document from its position in substantially a single plane and including means coupled from said detecting means to actuate said solenoid in the event of a document jam along said document path.

4. The combination as defined in claim 3 wherein said means connecting said post to said operating arm includes means for normally retaining said connection in an off-center relationship and biasing means connected to said post for urging said carriage away from the document path.

5. The combination as defined in claim 3 wherein said means for actuating said solenoid causes said finger to engage said means connecting said post to said operating arm and thereby cause said carriage to be positioned away from the document path.

6. The combination as defined in claim 3 including means supported above said base member and along the document path and movable with respect to said base member for permitting access to the document path.

7. A document sorting system comprising an input hopper for supporting documents to be sorted, means for successively removing documents from said input hopper, means for transporting the removed documents along a common document path, document deflecting means positioned along the document path, a movable carriage means positioned along and forming one side of the document path and cooperating with said means for transporting, said carriage comprising a base member, a post extending from said base member, an operating arm, mechanical linkage means connecting said post to said operating arm, a solenoid positioned below said base member, a finger coupled to said solenoid and engaging said mechanical linkage means connecting said post to said operating arm, and continuously operable jam detecting means positioned along the document path for detecting the abnormal departure of a document from its position in a substantially single plane, said jam detecting means comprising a support positioned away from the document path, a movable element retained by said support and positioned on one side of the document path, and switch means, said switch means positioned upon said support and having an actuating member in contact with said movable element which is depressed upon the application of a force greater than a predetermined force against said movable element.

8. The combination as defined in claim 7 including electrical means coupled between said switch means and said solenoid for displacing said carriage means away from the document path when said jam detecting means indicates a jam condition.

9. The combination as defined in claim 7 including an electrical circuit coupled from said switch means to said means for transporting documents to inhibit the means for transporting upon depression of said actuating members on said switch means by said movable element.

10. A document sorting system comprising, an input hopper for supporting documents to be sorted, means for successively removing documents from said input hopper, flexible belt means for transporting the removed documents along a common document path, a plurality of document deflecting means, first guide means having a plurality of removed portions each of which receives one of said document deflecting means, said first guide means positioned along and forming one side of the common document path, further guide means parallel to said first guide means forming the other side of the document path and selectively movable in a path perpendicular to said document path, continuously operating jam detecting means positioned along said document path for detecting the abnormal departure of a document from its position in substantially a single plane to produce a document jam, and means connecting said jam detecting means to said further guide means for displacing said further guide means upon the detection of a document jam by said detecting means.

11. In a document processor, first guide means, said first guide means including a plurality of sections arranged in a line, second guide means, said second guide means including a plurality of sections arranged in a line and substantially parallel to said first guide means, each of said sections of said second guide means containing at least one aperture therein, said first and second guide means forming a path therebetween along which documents may be passed, a plurality of selectively movable carriages, each of said carriages carrying at least one section of said second guide means, said carriages adapted for movement perpendicular to said path for documents and away from said first guide means, an electrical switch mounted at each said aperture in said second guide means sections, pivotally movable means mounted in each said aperture adjacent the associated electrical switch, said pivotally movable means adapted to actuate said electrical switch when said pivotally movable means is moved out of the associated aperture by the passing of a deformed document along said path adjacent said pivotally movable means, separate mechanical means connected to each said carriage for selectively maintaining said carriage in position where said second guide means sections carried thereby are spaced near to said first guide means, and separate electrically operable means for respectively interacting with each said mechanical means such that the effect of said mechanical means upon said carriage is altered whereby said carriage and said second guide means sections carried thereby may be spaced away from said first guide means, said electrically operable means being actuated only when said electrical switch is actuated.

12. In a document sorter having an elongated document processing path, means for detecting a malfunction thereof which causes a document to become deformed from the normal planar transfer position, said means for detecting being selectively positioned adjacent to and forming a part of guide means for said document processing path, said detecting means comprising a first pivotally movable member disposed parallel to and spaced from said path, said first pivotally movable member adapted to be moved only by a deformed document, electrical switch means mounted adjacent to said first pivotally movable member, said switch adapted to be actuated when said first pivotally movable member is moved by a deformed document, a solenoid connected to said electrical switch and controlled thereby, carriage means for carrying at least one of said detecting means, first means for biasing said carriage means in one position such that said detecting means forms a part of said guide means, and second means for biasing said carriage means in a second position such that said detecting means does not form a part of said guide means, said solenoid being operative to overcome said first biasing means such that said carriage means moves from said one position to said second position when said electrical switch is actuated.

13. The document sorter recited in claim 12, wherein said first biasing means comprises an over-center linkage which is selectively moved by said solenoid to remove the mechanical bias supplied thereby, and said second biasing means comprises a resilient member.

14. A document sorting system comprising, an input hopper for supporting documents to be sorted, means for successively removing documents from said input hopper, first and second flexible belt means for transporting the removed documents along a common document path, a plurality of document deflecting means, first guide means having a plurality of removed portions each of which receives one of said document deflecting means, said first guide means positioned along and forming one side of the common document path, second guide means parallel to said first guide means and forming the other side of the document path, said second guide means selectively movable in a path perpendicular to said document path, each of said first and second flexible belt means respectively disposed on opposite sides of said common document path, one of said flexible belt means being movable with said further guide means, continuously operating jam detecting means positioned along said document path for detecting the abnormal departure of a document from its position in substantially a single plane to produce a document jam, first electrical means connecting said jam detecting means to said further guide means for displacing said further guide means upon the detection of a document jam by said jam detecting means, and second electrical means connecting said jam detecting means to said flexible belt means for terminating the operation thereof whereby documents are not transported thereby upon the detection of a document jam by said jam detecting means.

References Cited by the Examiner

UNITED STATES PATENTS

| | | | |
|---|---|---|---|
| 2,689,647 | 9/54 | Hofstetter et al. | 209—90 |
| 2,793,035 | 5/57 | Wroblewski | 271—57 |
| 2,973,202 | 2/61 | Schmeck et al. | 271—57 |

ROBERT B. REEVES, *Acting Primary Examiner*.

RAPHAEL M. LUPO, SAMUEL F. COLEMAN, *Examiners*.